United States Patent Office 3,830,830
Patented Aug. 20, 1974

3,830,830
PRODUCTION OF DIALKYL ESTERS OF SUCCINIC ACID
James P. Cleveland, Kingsport, and James C. Martin, Johnson City, Tenn., assignors to Eastman Kodak Company, Rochester, N.Y.
No Drawing. Filed Feb. 29, 1972, Ser. No. 230,452
Int. Cl. C07c 69/40
U.S. Cl. 260—485 R               6 Claims

ABSTRACT OF THE DISCLOSURE

A process is disclosed for the production of dialkyl esters of succinic acid from maleic anhydride and a lower alcohol. The maleic anhydride is first esterified to form a monoalkyl maleate, which is next hydrogenated to form the corresponding succinate. The monoalkyl succinate is then esterified to form the corresponding dialkyl succinate. By use of this process, formation of undesirable side products such as fumarates and malates is substantially eliminated.

---

This invention relates to a process for the production of dialkyl esters of succinic acid from maleic anhydride and a lower alcohol.

It is well known in the art that maleic and succinic anhydrides may be reacted with alcohols to form monoalkyl maleates and succinates. It is also known that monoalkyl maleates and succinates may be esterified to form the dialkyl maleates and succinates using the proper esterification catalysts. In accordance with the present invention, a high yield process is provided for the production of dialkyl esters of succinic acid from maleic anhydride. In this process, the maleic anhydride is first converted to monoalkyl maleate. The monoalkyl maleate is hydrogenated to the corresponding succinate, and finally the monoalkyl succinate is esterified to a dialkyl succinate.

Dialkyl succinates are useful in the production of 1,4-butanediol and may be converted thereto by well-known reduction techniques. Such reactions are dealt with in "Reactions of Hydrogen With Organic Compounds Over Copper-Chromium Oxide and Nickel Catalysts" by Homer Adkins, 1937, (The University of Wisconsin Press, Wis.), beginning at page 97. 1,4-Butanediol, in turn, is especially useful as a reactant in esterification processes, especially in the production of certain polyesters which can be used to form fibers, films, molded objects, etc.

It is therefore an object of this invention to provide a process for producing esters of succinic acid, sometimes referred to herein as dialkyl succinates, particularly dimethyl succinate, from maleic anhydride in high yield.

It is another object of this invention to provide a process for producing dialkyl succinate from maleic anhydride without the formation of significant amounts of undesirable side products.

According to the present invention, maleic anhydride is converted in high yield to dialkyl succinate, suitable for conversion to 1,4-butanediol, in a particular sequence of steps, which avoids the formation of undesirable side products. Maleic anhydride, in either solid or molten form, is first esterified by reaction with an alcohol having from 1 to 4 carbon atoms to form a solution of monoalkyl maleate in alcohol, i.e.,

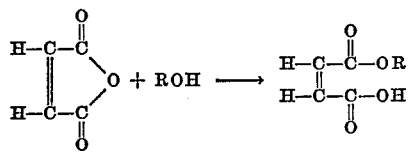

wherein R is alkyl containing from 1 to 4 carbon atoms. It is preferred that methyl alcohol be used for reasons such as economy, and because it has a low boiling point relative to ethyl, propyl and butyl alcohol. This is accomplished by dissolving 1 part maleic anhydride in from 1 to about 50 parts by weight alcohol at a temperature of between 0° C. and 120° C., preferably between about 20° C. and about 85° C. Preferably, the ratio of maleic anhydride to alcohol is between 1:1 and 1:8. Atmospheric pressures are suitable at the lower temperatures, but the pressure is desirably high enough to prevent the alcohol from boiling. The monoalkyl maleate in alcohol solution is then hydrogenated to the monoalkyl succinate, i.e.,

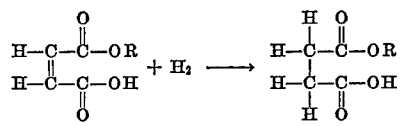

under suitable hydrogenation conditions. Surprisingly, it has been found that if the carbon to carbon double bond is hydrogenated at this point in the process, undesirable side reactions in the final esterification, i.e., formation of fumarates or maleates, is eliminated. Hydrogenation is readily accomplished under standard hydrogenating conditions. Suitable temperatures and pressures range from room temperature and 5 p.s.i. hydrogen up to and including 150° C. and 6,000 p.s.i. hydrogen for a time of between 5 minutes and 5 hours. Both supported and unsupported hydrogenation catalysts are effective. Suitable catalysts include palladium, platinum, rhodium, ruthenium, rhenium, copper chromite, Raney nickel, Raney copper, and Raney cobalt. Suitable catalyst supports include alumina, charcoal, calcium carbonate and kieselguhr. Following the hydrogenation, the hydrogenation catalyst is then removed, and the monoalkyl succinate in alcohol is esterified directly without added catalysts to the dialkyl succinate, i.e.,

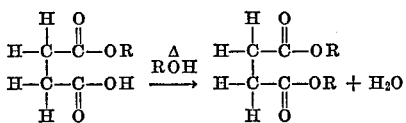

Esterification to form the diester is accomplished by heating the solution of monoalkyl succinate in alcohol in a suitable reaction vessel (such as a flask, autoclave, reactor column, etc.) to a temperature of between about 115° C. and about 300° C. and a pressure of from about 15 p.s.i. to about 5,000 p.s.i. without the addition of esterification catalyst, for a period of from 5 minutes to 10 hours. This reaction can be carried out in closed or open vessels, under batch or continuous conditions. The water formed in the process may be continuously removed if desired, and recovery of the dialkyl succinate is best accomplished by distillation. Dimethyl succinate is readily reduced to 1,4-butanediol under hydrogenolysis conditions over such catalysts as copper chromite.

The process as described herein has the unexpected advantage that the yield of dialkyl succinate is almost quantitative. Furthermore, no catalysts are required for the esterification, and, because no significant amounts of side products are formed, the necessity for purification is eliminated. It is a particular advantage of the process according to this invention that undesirable formation of dimethyl fumarate is eliminated. An additional advantage is that the reaction rate can be adjusted as desired by changing the reaction temperature without fear of the introduction of undesired side products. The alcohol, which is one of the starting reactants, also serves as a solvent throughout the process. Recovery of the product, dialkyl succinate, is readily accomplished by distillation. The essence of the invention is in carrying out the process by first monoesterifying maleic anhydride, then hydrogenating to eliminate the maleate double bond, and then esterifying a second time to form the succinate diester. This differs from conventional practice of forming the maleate diester in the first step, in that no opportunity is available for the maleate double bond to form undesirable side products.

The examples which follow are included for a better understanding of the invention.

EXAMPLE I

49 Grams of maleic anhydride are dissolved in 208 grams of methanol at 50° C. The mole ratio of methanol to maleic anhydride is 13 to 1. The clear, colorless solution containing monomethyl maleate is then hydrogenated at 70° C. at 1000 p.s.i. over 0.50 gram of 0.50% palladium on alumina to form monomethyl succinate. The hydrogenation requires 20 minutes to go to completion. The palladium on alumina catalyst is then removed by filtration and the resulting clear, colorless solution is heated in an autoclave for 2 hours at 225° C. After this time, the clear, almost colorless solution contains only methanol, water, monomethyl succinate, and dimethyl succinate. The yield of succinates is essentially quantitative based on maleic anhydride. The conversion to dimethyl succinate is about 93% by weight, based on the weight of maleic anhydride. The monomethyl succinate amounts to about 7% by weight. There are not maleates, fumarates, malates, or other discernible side products present. The compositions are determined by NMR (nuclear magnetic resonance) analysis. Further heating does not change the composition of color of the reaction material. All the components of the solution are readily separated by distillation.

EXAMPLE II

98 Grams of maleic anhydride are dissolved in 160 grams methanol at 50° C. The mole ratio of methanol to maleic anhydride is 5 to 1. This clear, colorless solution containing monomethyl maleate is hydrogenated at 70° C. and 40 p.s.i. over 0.50 gram of 5.0% palladium on carbon catalyst to form monomethyl succinate. The hydrogenation is complete in less than 15 minutes. The hydrogenation catalyst is removed by filtration and the clear, colorless solution is heated at 175° C. for 5 hours to form dimethyl succinate. After this time, the clear, almost colorless solution is composed of only methanol, water, and succinates. No side products are detectable by NMR analysis. Further heating does not change the composition or color of the reaction mixture. The yield of succinates is quantitative, based on maleic anhydride. The conversion to dimethyl succinate is about 86% based on the weight of maleic anhydride. The components are readily separated by distillation.

EXAMPLE III

98 Grams of maleic anhydride are dissolved in 592 grams butanol at 80° C. The mole ratio of butanol to maleic anhydride is 8 to 1. The resulting clear, colorless solution of dibutyl maleate is then hydrogenated at 80° C. and 500 p.s.i. hydrogen over 1.0 gram Raney nickel catalyst to form monobutyl succinate. Hydrogen uptake ceases after one hour. The hydrogenation catalyst is removed, and the clear, colorless solution is heated at 225° C. for 3 hours. After this time the clear, almost colorless solution is composed of only butanol, water, and succinates. The yield of succinates, based on maleic anhydride, is quantitative. No other side products are detectable by NMR spectroscopy. The conversion to dibutyl succinate is about 91% based on the weight of maleic anhydride. Further heating does not change the color or composition of the reaction mixture.

The following Examples IV–VI are control examples and illustrate the formation of side products and which occur when converting maleic anhydride to dialkyl succinate by way of dialkyl maleate.

EXAMPLE IV

98 Grams of maleic anhydride are dissolved in 160 grams methanol at 50° C. The mole ratio of methanol to maleic anhydride is 5 to 1. At this point the solution is clear and colorless and contains mostly monomethyl maleate and a very small amount of dimethyl maleate. No fumarates or malates are present. The solution is then heated at 225° C. for 2 hours. After this time the deep red-brown solution is composed of, by weight, 8% monomethyl maleate, 67% dimethyl maleate, 4% monomethyl fumarate, 18% dimethyl fumarate, and 2% of the methyl ether of dimethyl malate as determined by NMR analysis. Upon cooling to room temperature, the fumarate products crystallize from the solution. Further heating at 225° C. reduces the dimethyl maleate component and increase the fumarate and malate components in the then black reaction mixtures.

EXAMPLE V

98 Grams of maleic anhydride are dissolved in 228 grams of methanol at room temperature. The mole ratio of methanol to maleic anhydride is 9 to 1. The mixture becomes warm as the maleic anhydride dissolves. This clear, colorless solution is then heated for 5 hours at 175° C. After this time the very yellow solution contains, by weight, 11% monomethyl maleate, 78% dimethyl maleate, 1% monomethyl fumarate, 3% dimethyl fumarate and 7% of the methyl ether of dimethyl malate as determined by NMR analysis. Upon further heating for 4 more hours, the solution becomes yellow-brown, and the fumarate and malate components increase at the expense of the maleate component. Upon cooling to room temperature, the dimethyl fumarate crystallizes from the mixture.

EXAMPLE VI

98 Grams of maleic anhydride are dissolved in 160 grams of methanol at 50° C. The mole ratio of methanol to maleic anhydride is 5 to 1. This clear, colorless solution is then heated at 125° C. After 30 hours the reaction is not yet complete. At this time the yellow solution contains, by weight, 20% monomethyl maleate, 77% dimethyl maleate, and 3% fumarates as determined by NMR analysis. Further heating slowly carries the reaction to completion but also results in an increase in colored impurities and in the fumarate components.

Unless specified otherwise, all percentages, parts, etc. called for herein are by weight. Quantitative yield indicates that the yield is essentially 100%, i.e., all reactant material is accounted for.

The invention has been described in considerable detail with particular reference to certain preferred embodiments thereof, but it will be understood that variations and modifications can be effected within the spirit and scope of the invention.

We claim:

1. A process for the production of dialkyl succinate which comprises the steps of sequentially
    (a) contacting 1 part by weight maleic anhydride with from 1 to 50 parts by weight of an alcohol of the formula ROH at a temperature between about 0° C. and 120° C. to form a mixture of monoalkyl maleate of the formula

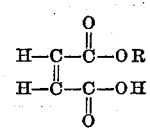

in said alcohol,
    (b) hydrogenating said monoalkyl maleate at a temperature of from about 25° C. to about 150° C.

while mixed with said alcohol to form a mixture of monoalkyl succinate of the formula

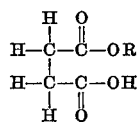

in said alcohol, and (c) subjecting said monoalkyl succinate-alcohol mixture, without added catalyst, to a temperature of between about 115° C. and about 300° C. at a pressure between about 15 p.s.i. and about 5000 p.s.i. to form the dialkyl succinate of the formula

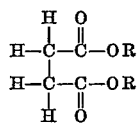

wherein R is an alkyl group having from 1 to 4 carbon atoms.

2. A process according to Claim 1 wherein R is a methyl group.

3. A process according to Claim 1 wherein 1 part maleic anyhdride is reacted with from 1 to 8 parts alcohol.

4. A process according to Claim 1 wherein said maleic anhydride is reacted with said alcohol at a temperature and pressure sufficient to prevent the alcohol from boiling.

5. A process according to Claim 1 wherein said monoalkyl maleate is hydrogenated between about 25° C. and about 5 p.s.i. hydrogen, and about 150° C. and 6,000 p.s.i. hydrogen over a catalyst selected from the group consisting of palladium, platinum, rhodium, ruthenium, rhenium, copper chromite, Raney nickel, Raney copper and Raney cobalt.

6. A process according to Claim 5 wherein the hydrogenation catalyst is removed prior to esterifying the monoalkyl succinate to dialkyl succinate.

References Cited

UNITED STATES PATENTS

| | | | |
|---|---|---|---|
| 3,391,183 | 7/1968 | Dowbenko | 260—485 |
| 3,172,904 | 3/1965 | Rehfuss | 260—485 |
| 3,336,239 | 8/1967 | Bailey et al. | 260—485 |
| 1,846,729 | 2/1932 | Jaeger | 260—485 |
| 1,844,394 | 2/1932 | Jaeger | 260—485 |

FOREIGN PATENTS

| | | | |
|---|---|---|---|
| 1,493,202 | 2/1969 | Germany | 260—485 |

LORRAINE A. WEINBERGER, Primary Examiner

E. J. SKELLY, Assistant Examiner